3,004,010
HIGH-POLYMER METAL COMPOUNDS AND PROCESS FOR MAKING SAME

Meyer Mendelsohn, New York, N.Y., assignor, by mesne assignments, to Yardney International Corporation, New York, N.Y., a corporation of New York
No Drawing. Filed Mar. 30, 1953, Ser. No. 345,741
7 Claims. (Cl. 260—91.3)

My present invention relates to high-polymer metallic compounds and to a process for making such compounds from a polymeric starting material, such as cellulose, thermoplastic resins and elastomers.

In my co-pending applications Ser. Nos. 294,908, filed June 21, 1952, 304,854, filed August 16, 1952, 331,325, filed January 14, 1953, and 338,083, filed February 20, 1953, as well as co-pending application Ser. No. 285,785, filed jointly by Frank Solomon and myself on May 2, 1952, there have been disclosed high-polymer compounds or oligodynamic metals, more particularly silver and gold, as well as processes for producing such compounds. It is the object of my present invention to provide similar high-polymer compounds of other metals as well as a process for producing same.

I have found, in accordance with the instant invention, that a whole series of hitherto, so far as I know, unknown compounds can be produced by treating a high-polymer starting material, of a type having at least one OH group, at elevated temperatures with an aqueous solution of a salt of any metal capable of yielding such solution. The resulting compounds are believed to be alcoholates of the respective metals, of the general form

R—OM wherein R is a high-polymer radical and M is a monovalent metal or compound of one or more metals.

In certain instances, particularly in the case of nobler metals such as silver, gold, platinum, and the like, it is advantageous to start by treating the high-polymer material with a solution of a relatively base metal and thereafter substituting said base metal with the desired noble metal, by treatment of the pre-treated material in a solution of the latter metal. Such substitution may be undertaken in a single step or in a plurality of stages involving treatments with solutions of progressively more noble metals. Thus the alkali metals, particularly the lighter ones (lithium, sodium and potassium), are well suited to act as preliminary hydrogen substituents preparatorily to substitution by one of the nobler metals, e.g. silver; they need, in fact, not be incorporated into the organic starting material in a separate treatment stage but may be admixed, as catalytic agents, with the aqueous solution of the nobler metal. Suitable aqueous solutions of these alkali metals include solutions of sodium (or potassium) thiosulfate or, preferably, solutions of compounds of these metals with low-carbon hydrocarbons, such as sodium (or potassium) acetate, as already disclosed in certain of the aforementioned co-pending applications.

Since the process according to the invention involves the substitution of a relatively easily replaceable hydrogen atom in a hydroxyl group, the resulting material will (at least in the case of relatively noble metals, standing above hydrogen in the electromotive series) be generally more resistant to chemical attacks than the unmodified starting material; a certain improvement in mechanical strength will also be observed in many instances. At the same time, the overall general appearance of the ultimate compound will differ but little from that of the starting material, except that a change in color will frequently occur. Furthermore, it appears that the oligodynamic properties of noble metals will be fully present and may even be markedly enhanced in compounds thereof prepared in accordance with my invention, whereby new materials having the physical structure of cellulosic, plastic or elastomeric substances yet endowed with substantial bactericidal and/or fungicidal powers will be obtained. The process of the invention, if applied to high-polymer starting materials in powder form (e.g. alpha-cellulose or comminuted polyvinyl alcohol), also lends itself to the manufacture of new types of pigments or opacifiers for lacquers, varnishes and the like. Sheet material treated in accordance with the invention may also be used advantageously as inter-electrode separators for electric cells, the presence of a compound of a relatively noble metal effectively impeding penetration of the separator by ions of a relatively base metal.

My experiments, including those disclosed in the various copending applications listed above, have shown that any high-polymer material having one or more hydroxyl groups will act as a suitable starting material in the production of compounds of the class herein described, yet that cellulose (e.g. in the form of cotton gauze, cellophane sheets or alpha-cellulose powder) represents a preferred starting material by virtue of its greater affinity for the metal solutions employed. While most of the following examples have been limited to cellulose by way of illustration, it should be understood that other materials of the previously defined group can be treated in analogous manner except for a possible increase in the treatment times and/or in the temperatures employed.

Example I

Alpha-cellulose powder is immersed in a 1% aqueous solution of cadmium sulfate $CdSO_4$, at a temperature of 80° C. and in the presence of sodium thiosulfate $Na_2S_2O_3$ having about the same concentration. The treatment is discontinued after 30 minutes, and the powder thereupon removed from the solution, washed and dried. The result is a powdered compound believed to be a cadmium alcoholate and adapted to be used for mildew-proofing.

Example II

Cotton gauze is immersed in a 1% aqueous solution of magnesium chloride $MGCl_2$, in the presence of sodium acetate $CH_3COONa$ having about the same concentration, at a temperature of 75° C. and for 15 minutes. The gauze is then washed and dried, leaving a white fabric of greater tensile strength than the original gauze. The magnesium alcoholate thus obtained may also be used as an intermediate product in the manufacture of an alcoholate of a noble metal (to be used, for example, as a bacteriostatic or bactericidal agent), such as silver, gold or platinum; thus the magnesium-treated gauze may be immersed for thirty seconds in a boiling aqueous solution of gold (or platinum) chloride prepared by dissolving about 0.5 g. of gold (or platinum) chloride in 1 ltr. of water, followed by washing and drying of the gauze.

Example III

Alpha-cellulose powder is immersed in a 1% aqueous solution of manganese chloride $MnCl_2$, in the presence of potassium acetate $CH_3COOK$ and under conditions similar to those set forth in the preceding example. A brownish powder with district germicidal properties results from this treatment.

Example IV

Cellophane (regenerated cellulose) is steeped in a 1% aqueous solution of titanium sulfur oxide $TiO_2 \cdot SO_2$, in the presence of sodium carbonate $Na_2CO_3$ of similar concentration, for thirty minutes at a temperature of 80° C. A modified cellopane incorporating what appears to be a titanium alcoholate, exhibiting improved resistance to penetration by metal ions when used as an inter-electrode separator in an alkaline battery, is thereby obtained.

*Example V*

Cellophane is immersed in an aqueous titanium chloride solution prepared by dissolving 48 g. of titanium oxide $TiO_2$ and 26 g. of hydrochloric acid HCl in 1 liter of water; antimony oxide $Sb_2O_3$ is added in an amount of 100 g. to the above solution, the same being thereupon heated to a temperature of 75° C. The cellophane, having remained for ten minutes in the heated solution, is then washed with a solution of sodium carbonate $Na_2CO_3$ to neutralize excess acidity, then washed and dried. The resulting sheet material, adapted to serve as a separator, apparently incorporates a titanium-antimony alcoholate with a titanium content of about 8% and a somewhat lesser antimony content, the former being greatly in excess of the titanium content obtainable with the procedure of the preceding example.

*Example VI*

Cellophane is immersed in a 1% aqueous solution of potassium zincate $Zn(OK)_2$, at temperatures of 75° C. and for fifteen minutes, then washed and dried. The resulting zinc alcoholate withstands penetration by zinc ions when used as a separator in an alkaline battery.

*Example VII*

Polyvinyl alcohol is immersed in a 1% aqueous solution of silver nitrate $AgNO_3$, in the presence of lithium acetate $CH_3COOLi$ of similar concentration, at 75° C. for thirty minutes. A penetration-resistant separator material is obtained with this treatment.

*Example VIII*

A zinc cellulosate, obtained by the treatment of alpha-cellulose powder with a solution of potassium zincate in the manner described for cellophane in Example VI, is steeped in an aqueous solution of a chromium salt, such as a 1% chromium trioxide $CrO_3$ solution, at 100° C. and for a period of about five minutes. This treatment substantially completely converts the zinc salt into a chromium salt, resulting in a greenish powder adapted to be used as a pigment.

*Example IX*

Alpha-cellulose powder is immersed in a 1% aqueous solution of ferrous chloride $FeCl_2$, at temperatures of 75° C. and for fifteen minutes, then washed and dried. The resulting powder, representing an iron cellulosate, is believed to be suitable as a carrier for orally administered iron given to anemic persons.

*Example X*

An aqueous solution of a rare-earth metal, such as a 2% solution of cerium nitrate $CeNO_3$, is heated to 75° C. and has enough alkali, such as sodium hydroxide, admixed with it to reduce its pH to approximately 6.8. Sodium acetate is added in a concentration of approximately 1%. Cotton gauze is steeped in this solution for one hour, then washed and dried. The so treated gauze has bactericidal and hemostatic properties.

The processes according to my invention have also been found suitable for the formation of complex high-polymer salts incorporating a non-metallic active group in addition to the metal substituent. Such salts are produced by forming an ester from a high-polymer alcohol radical and a radical of an organic or inorganic acid, preferably one having itself germicidal properties (if the final product is to be used for antiseptic purposes). The following two examples are given as illustrations of the use of an inorganic and an organic acid, respectively, in the formation of a bactericidal compound of this character.

*Example XI*

A 2% aqueous solution of phosphoric acid $H_3PO_4$ is heated to the boiling point, whereupon alpha-cellulose powder is immersed therein for twenty minutes. The powder is then washed and dried, until the pH is neutral, and thereafter treated for thirty minutes in a 1% silver nitrate solution, at 80° C., in the presence of sodium acetate of similar concentration. The final product is strongly germicidal and appears to be particularly effective against anaerobic organisms.

*Example XII*

Alpha-cellulose powder is treated in the same manner as in the preceding example, except that a 5% solution of formic acid HCOOH is used instead of the phosphoric acid and the temperature is maintained at 70° C. The powder finally obtained has properties similar to those noted above.

It will be understood that the foregoing examples are representative of processes for the production of a large class of novel, relatively stable compounds obtainable in accordance with my invention by the reaction of cellulosic or other high-polymer starting materials, of the character previously set forth, with aqueous solutions of metals not necessarily limited to those specifically enumerated hereinabove, and that all such products and their mode of manufacture are intended to be embraced within the scope of the invention as defined in the appended claims. Thus it may be mentioned, by way of illustration, that a zirconium cellulosate may be obtained from zirconium sulfate in a manner analogous to that described for cadmium sulfate in Example I, such cellulosate being believed to be useful as a waterproofing agent. Moreover, the treatment times, temperatures and concentrations are likewise susceptible to variations within relatively wide limits, the proportion of the metal embodied in the final product decreasing, in general, with lower temperatures and/or treatment periods while varying only to a minor extent with concentration. Broadly speaking, temperatures ranging between about 50 and 100° C. and treatment times of the order of one minute upward to approximately one hour have been found suitable.

I claim:
1. A process of forming a polymeric metallate, comprising the step of reacting, in an aqueous alkaline solution, a water-swellable high polymer, selected from the group which consists of cellulose and polyvinyl alcohol, with a water-soluble salt of a metal chosen from the group which consists of magnesium, zinc and cadmium.
2. The process of forming a cellulose metallate comprising the step of reacting, in an aqueous alkaline medium, cellulose with a water-soluble salt of a metal chosen from the group which consists of magnesium, zinc and cadmium.
3. The process of forming cellulose metallates which comprises the step of reacting, in an aqueous solution containing the cations of an alkali metal and the anions of a weak acid, cellulose with a water-soluble salt of a metal chosen from the group which consists of magnesium, zinc and cadmium.
4. The process of preparing zinc cellulosate which comprises the step of reacting, in an aqueous alkaline medium, cellulose with potassium zincate.
5. The process of preparing a magnesium cellulosate which comprises the step of reacting, in an aqueous alkaline medium, cellulose with magnesium chloride.
6. The process of claim 5 wherein the medium is rendered alkaline by the addition of sodium acetate.
7. The process of forming cadmium cellulosate which comprises the step of reacting, in an aqueous alkaline medium, cellulose with cadmium sulfate.

(References on following page)

References Cited in the file of this patent

UNITED STATES PATENTS

| | | |
|---|---|---|
| 1,661,201 | Stern | Mar. 6, 1928 |
| 2,130,212 | Watkins | Sept. 13, 1938 |
| 2,294,924 | Miller et al. | Sept. 8, 1942 |
| 2,311,058 | Lowe | Feb. 16, 1943 |
| 2,373,782 | Scheiderbauer | Apr. 17, 1945 |
| 2,396,514 | Kreidl et al. | Mar. 12, 1946 |
| 2,459,896 | Schwarz | Jan. 25, 1949 |
| 2,459,897 | Schwarz | Jan. 25, 1949 |
| 2,518,135 | Gaver | Aug. 8, 1950 |
| 2,518,193 | Signaigo | Aug. 8, 1950 |
| 2,525,049 | Signaigo | Oct. 10, 1950 |
| 2,549,940 | Signaigo | Apr. 24, 1951 |
| 2,572,923 | Gaver et al. | Oct. 30, 1951 |
| 2,609,368 | Gaver | Sept. 2, 1952 |
| 2,671,779 | Gaver et al. | Mar. 9, 1954 |

FOREIGN PATENTS

| | | |
|---|---|---|
| 542,581 | Germany | Jan. 26, 1932 |

OTHER REFERENCES

Ott: Cellulose and Its Derivatives, Interscience 1943, pages 113 to 115.

Heuser: The Chemistry of Cellulose, Wiley 1944, pages 91 to 93, 139 to 143, 155 to 157.